United States Patent [19]

Bouchard et al.

[11] 4,373,955

[45] Feb. 15, 1983

[54] LIGHTWEIGHT INSULATING CONCRETE

[75] Inventors: James P. Bouchard, Hinsdale; John D. Farrell, Plainfield, both of Ill.

[73] Assignee: Chicago Bridge & Iron Company, Oak Brook, Ill.

[21] Appl. No.: 317,988

[22] Filed: Nov. 4, 1981

[51] Int. Cl.$^3$ .................... C04B 1/00; C04B 7/02
[52] U.S. Cl. ........................... 106/88; 106/90; 106/98
[58] Field of Search ............ 106/88, 90, 97, 98, 106/119, 120

[56] References Cited

U.S. PATENT DOCUMENTS

| | | | |
|---|---|---|---|
| 2,172,076 | 9/1939 | Wolf et al. | 106/88 |
| 3,227,569 | 1/1966 | Thompson | 106/98 |
| 3,867,159 | 2/1975 | Ergene | 106/88 |

*Primary Examiner*—James Poer
*Attorney, Agent, or Firm*—Merriam, Marshall & Bicknell

[57] ABSTRACT

A lightweight insulating concrete having a K value of not more than 0.75, a compressive strength of at least 125 psi and consisting essentially of portland cement, pumice, silica and pulping waste liquor solids.

A method of producing a foamed insulating concrete comprising incorporating a hydrolyzed protein based aqueous foam in a slurry of portland cement, pumice, silica, pulping waste liquor and water to form a foamed concrete slurry and then curing the concrete slurry to a solid rigid concrete.

14 Claims, No Drawings

LIGHTWEIGHT INSULATING CONCRETE

This invention relates to insulating materials. More particularly, this invention is concerned with a novel lightweight concrete having good compressive strength and insulating properties.

BACKGROUND OF THE INVENTION

Various types of insulating materials are widely used to prevent or reduce heat transfer between separated spaces. Many of the insulating materials used need not be high strength materials since they bear little or no compressive loads. However, some of the insulating materials are used as foundation or base materials and as a result they must be able to withstand compressive loads of 50 to 100 psi or greater. In addition to bearing the applied load, the insulating material must often be able to withstand wide temperature cycles, such as from ambient temperature to $-200°$ F. or lower, without loss of, or change in, physical properties. This is especially so if the insulation is used in a cryogenic storage tank.

Many of the load bearing insulating materials are lightweight because they have a cellular structure, which enhances their insulating property, i.e., gives a lower thermal conductivity or K value. The cellular structure, however, often leads to a reduction in compressive strength. Insulating materials with a cellular structure having good compressive strength and good insulating properties are accordingly in demand. One type of such material which has such properties and maintains them in cryogenic use is foamed glass, one such product being commercially available as FOAMGLAS. Foamed glass is relatively expensive so a less expensive, though equally or better suited, product is desired.

It has been previously proposed to use foamed concretes as insulating materials. However, they have had one or more shortcomings, such as insufficient strength or poor insulating values, which have made them unsuitable for many uses, particularly in cryogenic storage structures. A need accordingly exists for a suitable lightweight insulating concrete having relatively high compressive strength with good low temperature of cryogenic insulating properties and which is made of low or reasonably priced ingredients.

DESCRIPTION OF THE INVENTION

According to one aspect of the subject invention there is provided a method of producing a foamed insulating concrete comprising incorporating a hydrolyzed protein based aqueous foam in a slurry of portland cement, pumice, silica, pulping waste liquor and water to form a foamed concrete slurry, and then curing the concrete slurry to a solid rigid concrete.

According to a further aspect of the invention there is provided a novel lightweight foamed insulating concrete having a K value of not more than 0.75 but generally not more than 0.65, a compressive strength of at least 125 psi and consisting essentially of portland cement, pumice, silica and pulping waste liquor. Although the product has wide application it is especially useful for low temperature uses, particularly in cryogenic environments. The novel concrete is produced by the previously described process.

In practicing the process of the invention, the normally dry portland cement, pumice and silica are first thoroughly mixed together, with or without the concomitant addition of water. The water can, of course, be added after the solid ingredients are thoroughly intermixed. The pulping waste liquor, whether liquid or in the form of the dried solids thereof, is best dispersed in the water before the water is combined with the stated dry ingredients.

To the resulting concrete slurry is added a previously formed stable aqueous based aerated foam with such mixing as is necessary to uniformly incorporate the foam throughout the slurry. After the foamed concrete slurry is produced it can be placed in a suitable mold or cast into a slab to cure. Curing can be effected at an atmospheric temperature above freezing but desirably at $68°-76°$ F. and atmospheric pressure.

Curing of the slurry, especially after it is shaped, is also readily effected in an autoclave. Curing in an autoclave can be at about atmospheric temperature and at an increased pressure such as up to about 150 psig. Alternatively, autoclave curing can be effected at an elevated temperature and atmospheric pressure. It is generally preferred, however, to at least partially cure the concrete at an elevated temperature and at an increased pressure. By applying an increased pressure at the start of curing and then reducing the pressure down to about atmospheric pressure close to the end of curing, development of cracks in the concrete is avoided or reduced. Specifically, curing in an autoclave can be effected at about $140°$ F. and a pressure of about 150 psig for 8 to 10 hours. Near the end of curing the pressure can be lowered to atmospheric pressure.

The resulting lightweight foamed insulating concrete will have a compressive strength of at least 125 psi and a K value of not more than about 0.75 and generally not more than 0.65. Particularly useful concretes have a density of about 20 to 40 pounds per cubic foot.

It is generally desirable in the production of the concrete slurry to employ the stated ingredients in the following amounts:
Portland cement—80 to 95 parts by weight
Pumice—1 to 15 parts by weight
Silica—0.5 to 5 parts by weight
Pulping sulfite waste liquor—0.2 to 2 parts by weight
Hydrolyzed protein based aqueous solution—2 to 4 parts by weight
Water—45 to 60 parts by weight Optimum concretes are presently considered to be obtained using the following amounts of ingredients:
Portland—94 pounds
Pumice—8±2 pounds
Silica—2±1 pounds
Pulping waste sulfite liquor—6±2 ounces
Hydrolyzed protein based aqueous foam—3±0.2 cubic feet
Water—6±0.5 gallons While other foaming agents could be suitably employed, highly satisfactory results are obtained by use of an aqueous hydrolyzed protein product previously used in making various types of foamed concretes and cements. See in particular Checko et al U.S. Pat. No. 3,522,069 for a further description of the foaming agent and apparatus useful for producing the foamed concrete slurry, the entire disclosure of which is incorporated herein by reference.

One suitable commercially available aqueous hydrolyzed protein foaming agent which can be used is Mearlcrete available from The Mearl Corporation, Roselle Park, N.J. About 100 to 200 ml of Mearlcrete can be mixed with one gallon of water and then the mixture foamed with air at 50 to 100 psig to produce a foam containing 1 to 50 volumes of air per volume of water in the foam. Suitable foams includes those having a density of about 1.5 to 2.5, and desirably 2 to 2.25, pounds per cubic foot. Furthermore, after the foam has been uniformly mixed with the other ingredients, the resulting foamed concrete slurry, prior to curing, desirably has a wet density of about 30 to 50, and more particularly 35 to 45, pounds per cubic foot.

Any suitable pulping waste liquor can be employed in producing the novel concrete although pulping sulfite waste liquor has proved to be especially suitable. In this regard, a product commercially available as Pozzolith 122-N from Master Builders Company, Cleveland, Oh., and believed to be a pulping sulfite waste liquor product, is especially useful in the invention for use as the pulping waste liquor ingredient. In this regard, Master Builders Company was granted a number of U.S. patents on the use of waste sulfite liquor with hydraulic cement, particularly portland cement, as an additive for concrete and mortar mixes, as see for example U.S. Pat. Nos. 2,081,642; 2,081,643; 2,099,176; 2,127,451; 2,169,980; and 2,435,594. For the purposes of this invention and claim interpretation, it is intended that Pozzolith 122-N is a sulfite waste liquor product.

The concentration of the waste pulping liquor is not narrowly critical and it can be adjusted for by altering the amount of additional water used in forming the slurry. Usually, however, the waste pulping liquor, if not concentrated, will contain about 15 to 20% by weight of total solids. It should be understood that dry solids from pulping waste liquor can be used in place of the liquid, and that the term "pulping waste liquor" as used herein is intended to include both forms.

Efforts to produce acceptable insulating concrete as described but with appreciable amounts of sand and/or lime led to inferior products. However, small amounts of these materials could be included but they offer no advantage and even a slight disadvantage in small amounts so they are desirably excluded from the formulation.

EXAMPLE 94 pounds of portland cement, 8 pounds of pumice and 2 pounds of silica (200 mesh) are thoroughly mixed dry. To the mixture is added 6 ounces of pulping sulfite waste liquor product (Pozzolith 122-N) and 6 gallons of water with adequate mixing to form a concrete slurry.

A stable foam is separately produced from a 4% by volume premix of Mearlcrete hydrolyzed protein and water by aerating it through a foaming nozzle using air at 60–80 psig at a flow rate of 5 cubic feet per minute. Three cubic feet of the foam, having a density of 2.1 pounds per cubic foot, was mixed into the concrete slurry in a 5 minute period using a conventional concrete mixer.

The foamed concrete slurry, having a wet density of about 39 pounds per cubic foot, was placed in molds and autoclaved at 140° F. at an initial pressure of 150 psig which was gradually lowered to zero in the last 2-3 hours of an 8 hour curing or drying period. The resulting lightweight insulating concrete had a compressive strength of 222 psi, a K value of 0.65 to 0.70 and a density of about 30 pounds per cubic foot.

What is claimed is:

1. A method of producing a foamed insulating concrete consisting essentially of incorporating a hydrolyzed protein based aqueous foam in a slurry of portland cement, pumice, silica, pulping waste liquor and water to form a foamed concrete slurry of the following amounts of ingredients:
   Portland cement—80 to 95 parts by weight,
   Pumice—1 to 15 parts by weight,
   Silica—0.5 to 5 parts by weight,
   Pulping sulfite waste liquor—0.2 to 2 parts by weight,
   Hydrolyzed protein based aqueous solution—2 to 4 parts by weight,
   Water—45 to 60 parts by weight,
and then curing the concrete slurry to a solid rigid concrete.

2. A method according to claim 1 in which the foam contains about 1 to 50 volumes of air per volume of water in the foam.

3. A method according to claim 1 or 2 in which the pulping waste liquor is a pulping sulfite waste liquor.

4. A method according to claim 1 in which the concrete slurry is molded into a shape and at least partially cured in an autoclave at an elevated temperature.

5. A method according to claim 4 in which the concrete is at least partially cured in the autoclave at an increased pressure above atmospheric pressure.

6. A method according to claim 5 in which the increased pressure is up to about 150 psig at the start of curing and the pressure is lowered to about atmospheric pressure near the end of curing to prevent crack formation in the concrete.

7. A method according to claim 1 in which the concrete slurry is molded into a shape and is at least partially cured in an autoclave at about atmospheric temperature above freezing and an increased pressure above atmospheric pressure.

8. A method according to claim 1 or 2 in which the foam has a density of 1 to 2.5 pounds per cubic foot.

9. A method according to claim 1 or 2 in which the foamed concrete slurry has a wet density of 30 to 50 pounds per cubic foot.

10. A method according to claim 1 in which approximately the following materials are used:
    Portland cement—94 pounds
    Pumice—8±2 pounds
    Silica—2±1 pounds
    Pulping waste sulfite liquor—6±2 ounces
    Hydrolyzed protein based aqueous foam—3±0.2 cubic feet
    Water—6±0.5 gallons 11. A lightweight insulating concrete produced by the process of claim 1, having a K value of not more than 0.75, a compressive strength of at least 125 psi and consisting essentially of portland cement, pumice, silica and pulping waste liquor solids.

12. A lightweight insulating concrete according to claim 11 in which the pulping waste liquid solids are from pulping sulfite waste liquor.

13. A lightweight insulating concrete according to claim 11 having good load bearing properties in low temperature use.

14. A lightweight insulating concrete according to claim 11 or 12 having a density of about 20 to 40 pounds per cubic foot.

* * * * *